United States Patent
Hassbring et al.

(10) Patent No.: US 12,118,731 B2
(45) Date of Patent: Oct. 15, 2024

(54) STATIC PRIVACY MASKING

(71) Applicant: Axis AB, Lund (SE)

(72) Inventors: Ludvig Hassbring, Lund (SE); Jessica Nilsson, Lund (SE); Song Yuan, Lund (SE)

(73) Assignee: Axis AB, Lund (SE)

( * ) Notice: Subject to any disclaimer, the term of this patent is extended or adjusted under 35 U.S.C. 154(b) by 70 days.

(21) Appl. No.: 18/172,411

(22) Filed: Feb. 22, 2023

(65) Prior Publication Data

US 2023/0298185 A1    Sep. 21, 2023

(30) Foreign Application Priority Data

Mar. 16, 2022   (EP) ..................................... 22162520

(51) Int. Cl.
    *G06T 7/20*       (2017.01)
    *G06F 21/62*      (2013.01)
    *G06V 20/52*      (2022.01)

(52) U.S. Cl.
    CPC ............ *G06T 7/20* (2013.01); *G06F 21/6245* (2013.01); *G06V 20/52* (2022.01); *G06T 2207/10016* (2013.01)

(58) Field of Classification Search
    None
    See application file for complete search history.

(56) References Cited

U.S. PATENT DOCUMENTS

| | | | | |
|---|---|---|---|---|
| 8,867,853 | B2* | 10/2014 | Migdal | G07F 19/207 |
| | | | | 382/103 |
| 8,965,047 | B1* | 2/2015 | Berlic | H04N 7/183 |
| | | | | 348/169 |
| 2009/0026987 | A1 | 1/2009 | Takahashi | |
| 2013/0108105 | A1* | 5/2013 | Yoo | H04N 5/275 |
| | | | | 382/103 |
| 2021/0209734 | A1 | 7/2021 | Simhadri et al. | |

FOREIGN PATENT DOCUMENTS

| | | |
|---|---|---|
| EP | 3706035 A1 | 9/2020 |
| WO | 2019/109722 A1 | 6/2019 |

OTHER PUBLICATIONS

Extended European Search Report dated Sep. 9, 2022 for European Patent Application No. 22162520.5.

* cited by examiner

*Primary Examiner* — Vikkram Bali
(74) *Attorney, Agent, or Firm* — Volpe Koenig (57) ABSTRACT

A method of masking in an output image stream includes receiving an input image stream capturing a scene, processing the input image stream to generate the output image stream, including using a detector to detect objects in the scene and a tracker to track objects in the scene based on information provided by the detector, and further including to generate a particular output image of the output image stream by checking whether there exists a particular area in the scene in which an evaluation of a historical performance of the detector and/or tracker fulfills at least one condition, and to, if confirming that such a particular area exists, mask the particular area of the scene in the particular output image. A corresponding device, computer program, and computer program product are also provided.

16 Claims, 4 Drawing Sheets

STATIC PRIVACY MASKING

TECHNICAL FIELD

The present disclosure relates to masking of objects in an image stream, such as an image stream captured by a monitoring (video) camera. In particular, the present disclosure relates to such masking in areas of a scene (captured in the image stream) where moving objects may be difficult to detect and thus also difficult to mask.

BACKGROUND

Although video monitoring of a particular scene may improve overall security, it may be desirable to keep certain objects in the scene from being identifiable by e.g., a person watching the recorded video footage from a monitoring camera capturing the scene. For example, for reasons of privacy, it maybe desirable that an identity of a person, or e.g., details of a license plate of a vehicle, captured by the camera should not be directly derivable from just watching the recorded video footage. Such protection of certain objects may be achieved by masking the objects in the image stream before outputting the image stream to e.g., a display or storage device. Such privacy masking may include e.g., covering an object with a solid color, blurring the object, pixelating the object, or even making the object more or less transparent, within each image of the output image stream.

Before being able to mask a particular object, the location of the object within an image must first be estimated. This may be achieved by using an object detection algorithm which has been trained/configured to detect e.g., objects of a certain class (such as faces, persons, license plates, etc.) within an image. In particular for moving objects, an object tracking algorithm may also be used. The object tracking algorithm may receive regular updates from the object detection algorithm about the location of an object, and may be trained/configured to estimate the location of the object and thereby track the movement of the object in-between receiving such regular updates from the object detection algorithm. Once a location of an object has been detected and/or tracked, the privacy mask can then be applied to the object.

However, to build trust for such privacy masking, it is important that an object is kept masked in all images of an output image stream, even when the circumstances are such that detecting the location of the object is difficult. The object detection algorithm may for example fail to properly locate the object if the object becomes partially hidden behind another object, or if the object is for example only partially within the scene as depicted in the image stream captured by the monitoring camera. This may cause a failure of masking the object based on information from the object detection algorithm alone. In addition, this may also stop the object detection algorithm from regularly providing updates to the object tracking algorithm, and masking of the object based on information provided by the object tracking algorithm may thus also fail.

SUMMARY

To at least partially solve the above identified problem of unreliable masking of an object in conditions where the location of the object may be difficult to determine, the present disclosure provides an improved method of masking in an output image stream, a corresponding device, computer program, and computer program product, as defined in the accompanying independent claims. Various alternative embodiments of the improved method, device, computer program and computer program product are defined in the accompanying dependent claims.

According to a first aspect of the present disclosure, a method of masking in an output image stream is provided. The method includes receiving an input image stream capturing a scene. The method includes processing the input image stream to generate an output image stream, including, based on the input image stream, detecting, and tracking one or more objects in the scene. The one or more objects in the scene are tracked using an object detection algorithm and an object tracking algorithm. The object tracking algorithm receives information indicative of objects to be tracked from the object detection algorithm. The processing (of the input image stream) further includes, in order to generate a particular output image of the output image stream, checking whether there exists a particular area of the scene in which one or more of the following conditions are fulfilled: a) a historical performance of the object detection algorithm includes that the object detection algorithm has been certain that there is an object to be masked, but in which the object detection algorithm has then become uncertain whether there is any object to be masked; b) the historical performance of the object detection algorithm includes that the object detection algorithm has been more uncertain than certain whether there is any object to be masked or tracked; c) the historical performance of the object tracking algorithm includes that the object tracking algorithm has stopped receiving information from the object detection algorithm indicative of an object to be tracked; d) the historical performance of the object tracking algorithm includes that the object tracking algorithm has started or resumed to receive information from the object detection algorithm indicative of an object to be tracked but has not yet been able to start or resume tracking the object to be tracked, and/or e) the historical performance of the object tracking algorithm includes that an uncertainty of a position in the scene of an object tracked by the object tracking algorithm has been deemed being too great to mask the object. If it is confirmed that the particular area of the scene exists (i.e., by fulfilling at least one of the above conditions), the method includes (statically) masking the particular area of the scene in the particular output image.

As used herein, information "indicative of an object to be tracked" may for example include a detected (center) coordinate of an outer shape of the object in the image plus information about the outer shape of the object. Other alternatives may for example include a (center) coordinate of the object in the image, an orientation of the object, and a size of the object along at least one axis, etc. Other alternatives may for example include only a (center) coordinate of the object, or similar. Alternatively, or in addition, the indication of the object to be tracked may for example include all pixels of the image which are determined to belong to the object, or similar.

As used herein, evaluating a "historical performance" of an algorithm means that the performance for the algorithm is evaluated for at least one or more image frames previous to (in time, in the order as captured by e.g., a camera) the particular image frame which is to be generated as part of the output image stream. The number of such previous image frames can be varied dynamically depending on e.g., one or more conditions of the scene, such as time-of-day, lighting conditions, or similar. The number of previous image frames may also be predefined, and correspond e.g., to image frames spanning a certain number of seconds, minutes, hours, days, weeks, months, or similar, before the particular output image. The input image (and the analysis/processing thereof) of the input stream corresponding to the particular output image in the output stream may of course also be included as part of the evaluation of the historical performance of an algorithm, and e.g., in some sense be considered as being part of the history. Or, phrased differently, evaluating the performance of an algorithm may include looking at a performance of the algorithm both in one or more previous input images and also in a current input image which corresponds to the particular output image.

The method as presented and envisaged herein improves upon current technology in that it uses an evaluation of a historical performance of the object detection algorithm and/or the object tracking algorithm to identify one or more "problematic areas" of the scene wherein these algorithms may historically have had a more difficult time of properly identifying the existence of, and also determining the location of, an object in the scene. Such problematic areas may e.g., correspond to areas wherein an object is more likely to suddenly disappear from the scene or suddenly appear in the scene. By at least temporarily masking such areas, the disclosed method allows to avoid failing to mask an object in such areas only because the object tracking algorithm and/or the object detection algorithm suddenly loses track of the object, and/or because the object tracking algorithm has not yet had sufficient time (i.e., received sufficiently many indications from the object detection algorithm) to properly estimate the location of the object.

In some embodiments of the method, the object detection algorithm may be such that it generates a probability (i.e., a value between 0 and 100%, or a value between 0.0 and 1.0, or similar) of an object being in the particular area of the scene. The more certain the object detecting algorithm is that there is an object in the particular area of the scene, the higher the probability may be (i.e., approaching or reaching 100%). The more certain the object detection algorithm is that there is no object in the particular area of the scene, the lower the probability may be (i.e., approaching or reaching 0%). That the object detection algorithm is certain that there is an object to be tracked in the particular area of the scene may thus be rewritten as a requirement of the probability exceeding a first threshold. That the object detection algorithm is certain that there is an object to be masked in the particular area of the scene may thus be rewritten as a requirement of the probability exceeding a second threshold. The requirement for there being an object which is to be tracked may be lower than (or equal to) that of there being an object to be masked, i.e., the second threshold may be equal to or greater than the first threshold. For example, the first threshold (for tracking) may be e.g., 60%, while the second threshold (for masking) may be e.g., 80%. As used herein, it is envisaged that the object detection algorithm does not detect objects which it knows belong to a class that is not supposed to be masked. The object detection algorithm may of course be trained to also detect such other objects and indicate them as objects to be tracked, but to ease the discussion these situations will not be discussed herein.

Instead of a single probability, it is envisaged that the object detection algorithm may instead output e.g., two probabilities (i.e., a first probability and a second probability). The first probability may indicate how certain the algorithm is that there is an object in the particular area, while the second probability may instead indicate how certain the algorithm is that there is no object in the particular area. This may be beneficial as it may be checked whether both probabilities happen to be either high or low at the same time, and to then rule such situations as non-reliable. Similarly, if one probability is high while the other one is low, such a result may then be deemed as being more reliable. In other embodiments, such two probabilities may of course be used to construct a single probability as discussed above. For example, the first probability being 50% and the second probability also being 50% may correspond to the single probability being 50%. The first probability being 100% and the second probability being 0% may correspond to the single probability being 100%. The first probability being 0% and the second probability being 100% may correspond to the single probability being 0%, and so on and so forth. Other alternatives are of course also envisaged, as long as the object detection algorithm is at least capable of outputting some value from which it may be determined whether it is certain that there is no object, certain that there is an object, or anywhere there in between (e.g., more or less uncertain whether there is any object or not).

In one or more embodiments of the method, that the object detection algorithm is uncertain whether there is any object to be tracked may include the probability not exceeding the first threshold but exceeding a third threshold which is smaller than the first threshold. Similarly, that the object detection algorithm is uncertain whether there is any object to be masked may include the probability not exceeding the second threshold but exceeding a fourth threshold smaller than the second threshold. Continuing the example provided above, the first threshold may be 60% and the third threshold may be 20%, such that the object detection algorithm is uncertain whether there is any object to be tracked if the probability is between 20% and 60%. Similarly, the second threshold may be 80% and the fourth threshold may be 20%, such that the object detection algorithm is uncertain whether there is any object to be masked if the probability is between 20% and 80%.

In one or more embodiments of the method, the method may include defining the particular area of the scene by requiring that, historically, both conditions b) and e) (as defined above) have occurred. Phrased differently, defining the particular area of the scene may require that the historical performance of the object detection algorithm includes that the object detection algorithm has been more uncertain than certain whether there is any object to be masked, and also that the historical performance of the object tracking algorithm includes that an uncertainty of a position in the scene of an object tracked by the object tracking algorithm has been deemed being too great to mask the object.

In one or more embodiments of the method, defining the particular area of the scene may include/require the occurrence of condition a) as defined above, and further also that a rate (or speed) of the object detection algorithm becoming uncertain whether there is any object to be masked exceeds a fifth threshold. Phrased differently, defining the particular area of the scene may require that the historical performance of the object detection algorithm includes that the object detection algorithm has been certain that there is an object to be masked, but in which the object detection algorithm has then become more uncertain whether there is any object to be masked, and that the rate at which the object detection algorithm becomes uncertain is above the fifth threshold. The rate at which the object detection algorithm becomes uncertain may be defined as e.g., how fast the probability of there being an object at/in the particular area of the scene reduces. The rate and fifth threshold may be measured in e.g., units of percent per time. For example, if the probability suddenly (e.g., within a few seconds) decreases from above 80% to below 80% (and e.g., below 60%, or 50%, or even lower), it may be considered that the rate of becoming uncertain is above the fifth threshold. Likewise, if the probability decreases from above 80% to below 80% during a long time (e.g., several minutes, or hours, or similar), it may be considered that the rate of becoming uncertain is not above the fifth threshold. As will be described later herein, a quick reduction in certainty of there being an object may e.g., correspond to a situation wherein a blocking object suddenly enters the scene and hides one or more other objects that were previously fully visible, and which are supposed to be masked.

In one or more embodiments of the method, the historical performance of the object detection algorithm and/or the object tracking algorithm may be evaluated using a heatmap. Phrased differently, and as will be described in more detail later herein, the heatmap may be such that areas of the scene where at least one of the above conditions a)-e) occur more frequently are kept at a "warmer temperature" than areas of the scene where the above conditions a)-e) occur less frequently or not at all. A warm area (e.g., an area with a "temperature" exceeding some predefined value) may then be considered as the, or a, particular area of the scene, and be at least temporarily masked in the output image stream. A cold area (e.g., an area with a temperature below the predefined value) may instead be considered as not being the, or a, particular area of the scene, and any mask previously applied in this area may be removed in the output image stream.

In one or more embodiments of the method, evaluating the historical performance of the object detection algorithm and/or the object tracking algorithm may include an outcome of an earlier processing of a finite number of input images of the input image stream preceding the particular output image in time. The finite number of input images of the input image stream preceding the particular output image in time may be lower than a total number of input images of the input image stream preceding the particular output image in time. Phrased differently, evaluating the historical performance of the object detection algorithm and/or the object detection algorithm may include not using all available previous results of these algorithms, but to instead only study how the algorithms have performed during e.g., a last number of second, minutes, hours, days, weeks, or months, and so on. In other embodiments, if possible, evaluating the historical performance of an algorithm may an outcome for all previously analyzed and processed image frames.

In one or more embodiments of the method, the method may further include checking whether there exists any are of the scene in which none of the above defined conditions a)-e) has historically occurred and, if confirming that such an area exists, unmasking such an area in the particular output image of the output image stream. Here, as described above, "historically" may also include looking only at a limited number of previously processed input images only.

In one or more embodiments of the method, the method may be performed in a monitoring camera. The monitoring camera may be configured to capture the input image stream. Phrased differently, the method may be performed "at the edge" of e.g., a monitoring camera system (instead of e.g., at a centralized server or similar), in a camera used to capture the input image stream which the method includes the processing of. Performing the method in the monitoring camera itself (i.e., at the "edge") may reduce the need for any subsequent processing of the image stream output from the monitoring camera for the purpose of privacy masking, etc.

According to a second aspect of the present disclosure, a device for masking in an output image stream is provided. The device includes a processor and a memory. The memory stores instructions that, when executed by the processor, cause the device to: receive an input image stream capturing a scene; process the input image stream to generate an output image stream, including, based on the input image stream, to detect and track one or more objects in the scene using an object detection algorithm and an object tracking algorithm receiving information indicative of objects to be tracked from the object detection algorithm, and, to generate a particular output image of the output image stream, to check whether there exists a particular area of the scene in which at least one of the following conditions a)-e) have occurred: a) a historical performance of the object detection algorithm includes that the object detection algorithm has been certain that there is an object to be masked, but in which the object detection algorithm has then become uncertain whether there is any object to be masked; b) the historical performance of the object detection algorithm includes that the object detection algorithm has been more uncertain than certain whether there is any object to be masked or tracked; c) the historical performance of the object tracking algorithm includes that the object tracking algorithm has stopped receiving information from the object detection algorithm indicative of an object to be tracked; d) the historical performance of the object tracking algorithm includes that the object tracking algorithm has started or resumed to receive information from the object detection algorithm indicative of an object to be tracked but has not yet been able to start or resume tracking the object to be tracked, and/or e) the historical performance of the object tracking algorithm includes that an uncertainty of a position in the scene of an object tracked by the object tracking algorithm has been deemed being too great to mask the object. Further, the instructions are such that, if it is confirmed that the particular area of the scene exists, the particular area of the scene is masked in the particular output image.

Phrased differently, the instructions are such that they cause the device to perform the method according to the first aspect.

In one or more embodiments of the device, the instructions may be further configured to cause the device to perform any embodiment of the method of the first aspect as disclosed herein.

In one or more embodiments of the device, the device may be a monitoring camera. The monitoring camera may be configured to capture the input image stream. For this purpose, the monitoring camera may include e.g., one or more lenses, one or more image sensors, and e.g., various electronics components required to capture the input image stream.

According to a third aspect of the present disclosure, a computer program is provided. The computer program is configured to cause, when executed by e.g., a processor of a device according to the second aspect, cause the device to: receive an input image stream capturing a scene; process the input image stream to generate an output image stream, including, based on the input image stream, to detect and track one or more objects in the scene using an object detection algorithm and an object tracking algorithm receiving information indicative of objects to be tracked from the object detection algorithm, and, to generate a particular output image of the output image stream, to check whether there exists a particular area of the scene in which at least one of the following conditions a)-e) have occurred: a) a historical performance of the object detection algorithm includes that the object detection algorithm has been certain that there is an object to be masked, but in which the object detection algorithm has then become uncertain whether there is any object to be masked; b) the historical performance of the object detection algorithm includes that the object detection algorithm has been more uncertain than certain whether there is any object to be masked or tracked; c) the historical performance of the object tracking algorithm includes that the object tracking algorithm has stopped receiving information from the object detection algorithm indicative of an object to be tracked; d) the historical performance of the object tracking algorithm includes that the object tracking algorithm has started or resumed to receive information from the object detection algorithm indicative of an object to be tracked but has not yet been able to start or resume tracking the object to be tracked, and/or e) the historical performance of the object tracking algorithm includes that an uncertainty of a position in the scene of an object tracked by the object tracking algorithm has been deemed being too great to mask the object. Further, the instructions are such that, if it is confirmed that the particular area of the scene exists, the particular area of the scene is masked in the particular output image.

Phrased differently, the computer program is such that it causes the device to perform the method according to the first aspect.

In one or more embodiments of the computer program, the computer program may further be configured to cause the device to perform any embodiment of the method of the first aspect as disclosed herein.

According to a fourth aspect of the present disclosure, a computer program product is provided. The computer program product includes a computer readable storage medium on which a computer program according to the third aspect (or any embodiment thereof) is stored.

Other objects and advantages of the present disclosure will be apparent from the following detailed description, the drawings, and the claims. Within the scope of the present disclosure, it is envisaged that all features and advantages described with reference to e.g., the method of the first aspect are relevant for, apply to, and may be used in combination with also any feature and advantage described with reference to the device of the second aspect, the computer program of the third aspect, and/or the computer program product of the fourth aspect, and vice versa.

BRIEF DESCRIPTION OF THE DRAWINGS

Exemplifying embodiments will now be described below with reference to the accompanying drawings, in which.

In the drawings, like reference numerals will be used for like elements unless stated otherwise. Unless explicitly stated to the contrary, the drawings show only such elements that are necessary to illustrate the example embodiments, while other elements, in the interest of clarity, maybe omitted or merely suggested. As illustrated in the Figures, the (absolute or relative) sizes of elements and regions maybe exaggerated or understated vis-à-vis their true values for illustrative purposes and, thus, are provided to illustrate the general structures of the embodiments.

DETAILED DESCRIPTION

Various example situations in which an object detection algorithm may find it difficult to properly indicate an object, and/or where an object tracking algorithm may find it difficult to properly track an object, will now be described with reference to FIGS. 1A-1C. With references also to FIGS. 3 and 4, it will be explained how a method as envisaged herein can be used to overcome the disadvantages of commonly available technology and solutions for masking in an output image stream. In what follows, to ease the reading experience, the terms "object detection algorithm" and "detector" will be used interchangeably. The same applies to the terms "object tracking algorithm" and "tracker", which will be used interchangeably as well.

Herein, a detector is envisaged as being implementable using e.g., one or more commonly available algorithms for object detection as already available within the various fields of computer technology, such as e.g., computer vision and/or image processing. Such algorithms may e.g., be envisaged as including both non-neural and neural approaches. A minimal requirement is however that whatever algorithm (or combinations of algorithms) being used are able to determine, at least in ideal conditions, whether a particular object (such as a face, body, license plate, etc.) that is supposed to be masked is present in an image, and in particular at what position and/or area of the image the object is located. Whether the used algorithms are e.g., feature-based, template-based and/or motion-based is not important as long as the above requirements are met. A detector may for example be implemented using one or more neural network specifically trained for that purpose. For the purpose of the present disclosure, it is also assumed that such algorithms used in/for the detector may struggle to properly identify and/or locate objects which are partially hidden within an image of a scene (e.g., a person behind partially obscured by a tree, vehicle or similar).

Similarly herein, a tracker is envisaged as being implementable using e.g., one or more commonly available algorithms for object tracking. Such algorithms may e.g., be bottom-up processes relying on target representation and localization, and include e.g., kernel-based tracking, contour tracking, or similar. Other envisaged algorithms for tracking may e.g., be top-down processes, including e.g., the use of filtering and data association, and implement e.g., one or more Kalman and/or particle filters. Herein, it is envisaged that such tracking algorithms may receive input from the detector, and to then use the received input to follow an object in the scene over time, including also if further inputs/updates from the detector are not provided during a limited time. For the purpose of the present disclosure, it is assumed that even if a tracker is able to track/follow an object at least a couple of images/frames of an image stream after it has stopped receiving updates from the detector, the quality of such tracking will deter with time as no new input from the detector arrives. After a while, the tracker will thus fail to properly track the object. It is also assumed that the tracker requires some time after receiving its first input/update from the detector before it is able to lock on to the object and perform successful tracking. Phrased differently, the tracker needs more than a single data point from the detector in order to arrive at a conclusion about where the object will be/move next, and may therefore struggle with how to track an object which has just recently appeared in an image of a scene (such as e.g., a person entering the scene through a door, via a road/walkway, or similar).

For the examples provided herein, it will be assumed that the detector is configured to detect only objects which are to be masked. The detector may of course be configured to detect also other objects, for other reasons, but these objects will not be considered in what follows. It is further assumed that the detector can generate a probability which tells how certain the detector is that there is an object at a particular position of the image of the scene. Preferably, the detector can also tell how certain it is that there is not an object at the particular position of the image of the scene. Exactly how the detector communicates such information can of course vary depending on the exact implementation of the detector. For the examples provided herein, it will however be assumed that the detector provides a probability $P(x, y) \in [0.0, 1.0]$, where $(x, y)$ is a 2-tuple (pair) corresponding to e.g., a particular pixel in the image of the scene, or e.g., indexes a particular area in the image of the scene. It may also be envisaged that the detector provides e.g., a probability $P(\vec{x}, \vec{y})$, where $\vec{x}$ and $\vec{y}$ are instead arrays of coordinate such that the returned probability corresponds to a probability of there being an object at the pixels of these arrays.

A higher value of the probability indicates that the detector is more certain that there is an object at the particular position, and a lower value of the probability indicates that the detector is certain that there is no object at the particular position. An intermediate value of the probability correspondingly then indicates that the detector is uncertain whether there is an object at the particular position or not. For example, a value of $P(x, y)=1.0$ indicates that the detector is maximally certain that there is an object at $(x, y)$, a value of $P(x, y)=0.0$ indicates that the detector is maximally certain that there is no object at $(x, y)$, while a value of e.g., $P(x, y)=0.5$ (or at any intermediate value if not using a linear scale between the two extremes 0.0 and 1.0) indicates that the detector is maximally uncertain whether there is an object at $(x, y)$ or not.

It is further distinguished between objects which are to be tracked and objects which are also to be masked. The requirement of an object to be tracked may be lower than a requirement of an object to be masked. For example, it may be decided that a probability exceeding a first threshold $T_1$ (e.g., 0.6, or 60%) corresponds to an object which is to be tracked, and that a probability exceeding a second, higher threshold $T_2$ (e.g., 0.8, or 80%) corresponds to an object which is to be masked. These values are of course provided only as examples, and may be changed as desired based on e.g., the particular scene which is monitored, the particular objects which are to be detected/tracked/masked, and so on.

There may also be corresponding thresholds below which it is decided that the detector is certain enough that there is no object which should be tracked or masked. These lower thresholds may be equal, or different. For example, it may be decided that the detector is certain that there is no object to be tracked if the probability goes below a third threshold $T_3$ (e.g., 0.2, or 20%), and that the detector is certain that there is no object to be masked if the probability goes below a fourth threshold $T_4$ (e.g., also 0.2, or 20%). If the probability is e.g., between $T_3$ and $T_1$, the detector may be said to be uncertain whether there is an object to be tracked. Likewise, if the probability is e.g., between $T_4$ and $T_2$, the detector may be said to be uncertain whether there is an object to be masked.

It is of course envisaged that the detector may indicate whether it is certain about there being an object (either to be tracked or also masked) in other ways than those described above. For example, and as described earlier herein when summarizing the accompanying claims, the detector may output two different probabilities, where a first probability indicates how certain the detector is that there is an object at a particular region/position/area of the scene, and where a second probability indicates of certain the detector is that there is no object at the particular region/position/area of the scene. This may be useful in that the consistency may be checked, such that any event where the detector indicates both of these probabilities as being simultaneously high (or both being simultaneously low) may be discarded as unreliable information. If using for example a neural network-based solution to implement the detector, the value of one output neuron may correspond to the first probability, while the value of another output neuron may correspond to the second probability.

If the detector deems an object as being an object to be masked (e.g., when the probability exceeds the second threshold $T_2$), the location of the object may be provided by the detector to a masking unit configured to apply an appropriate masking of the object in an output image. The detector may also inform the tracker that the object that should be tracked is an object which should also be masked, and the tracker may then (when following the object across the scene) provide information to the masking unit about the current location of the object in the scene, such that the masking unit may apply and/or update the location of the corresponding masking in an output image.

Figure 1A:
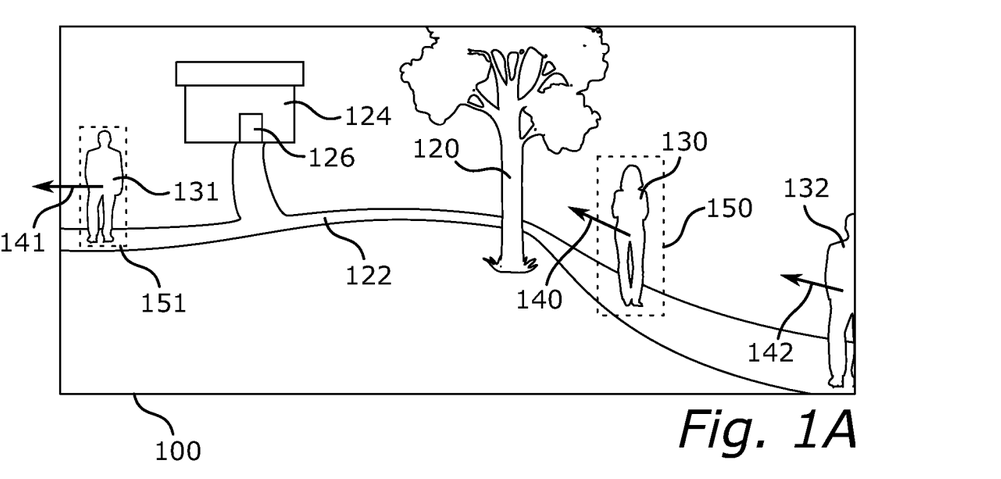
FIGS. 1A-1C schematically illustrate an example of a situation in which embodiments of a method according to the present disclosure is applicable.

FIG. 1A schematically illustrates a first image 100 from an input image stream capturing a particular scene. The scene is from e.g., a park, and includes a tree 120, a walkway 122 partially extending behind the tree 120, a building 124 with a door 126, and at least three persons 130, 131 and 132. The persons 130, 131 and 132 are currently, when the first image 100 was captured, moving along the walkway 122 according to the arrows 140, 141 and 142, respectively. The image stream is captured/generated by e.g., a monitoring camera facing the scene. For privacy reasons, it is desirable that the identities of the persons 130, 131 and 132 are not derivable from looking at an output stream from the camera, and the persons 130, 131 and 132 should therefore be masked in such an output image stream.

In the first image 100, both persons 130 and 131 are fully visible, and a detector has therefore been able to note the presence of both persons 130 and 131 in the scene. The detector is thus considered as being certain that the persons 130 and 131 are objects in the scene, and that these objects should at least be tracked (and most likely also masked). The detector has accordingly provided the detected positions of the persons 130 and 131 to a tracker as information indicative of objects to be tracked (and possibly also masked). The tracker manages to track the persons 130 and 131 as indicated by the dashed boxes 150 and 151 surrounding these persons.

The person 132 is however not yet fully in the scene, and the detector is therefore uncertain whether person 132 is in the scene or not, and consequently uncertain also about whether person 132 is an object which is to be tracked or not. The tracker has thus not previously been fed any indications regarding the person 132 as an object to be tracked, and there is no tracking of the person 132 currently available (as indicated by a lack of a corresponding dashed box surrounding the person 132).

If applying privacy masks based only on where the detector and/or tracker currently indicates where objects (such as persons 130 and 131) are located, such masking would result in a mask being properly applied to persons 130 and 131 in the first image 100, but not to person 132 as person 132 has not yet been identified by neither the detector nor the tracker due to not having fully entered the scene yet. An image of an output image stream corresponding to the first image 100, based on such conventional privacy masking, would thus fail to hide at least the identity of the person 132.

As described earlier herein, that the detector "indicates" an object is equivalent to the detector being able to provide information indicative of the object to the tracker. The information may e.g., include an estimated central position of the object, a size of the object, a contour of the object, an orientation of the object, the exact pixels in the image of the scene which correspond to the object, or any combination of these or other parameters from which it may be derivable where in the scene the object is and which pixels in the image of the scene that should e.g., be altered in order to mask the object.

Figure 1B:
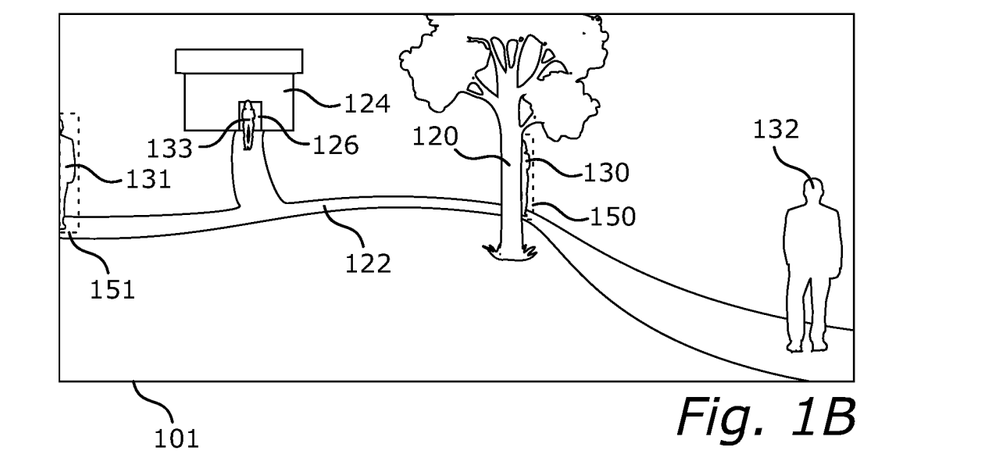
Figure 1C:
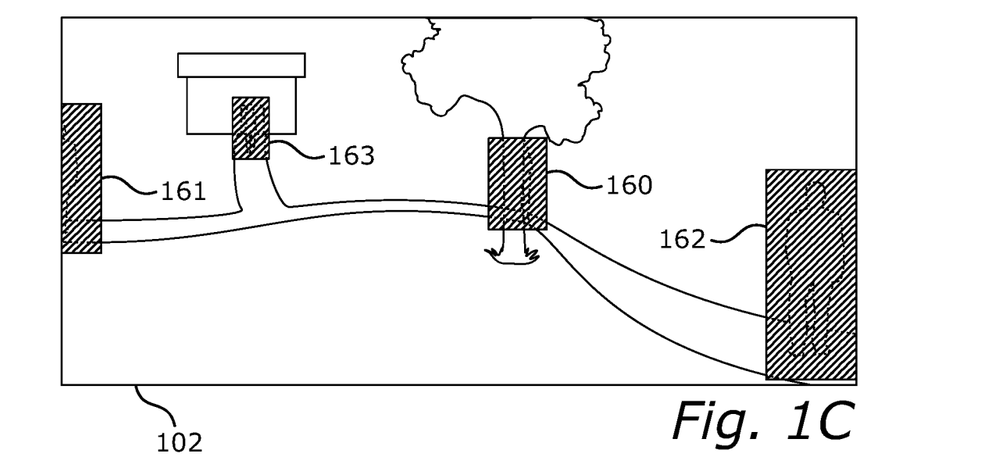

FIG. 1B schematically illustrates a second image 101 from the same image stream as in FIG. 1A. The second image 101 is subsequent to the first image 100, i.e., corresponding to and captured at a later time-instance than the first image 100. In the second image 101, the positions of the persons 130, 131 and 132 have changed. A fourth person 133 has also appeared in the scene, e.g., by entering the scene by exiting the house 124 through the door 126.

Person 130 has moved partially behind the tree 120, and the detector has thus become uncertain whether person 130 is an object to be tracked or not. Likewise, person 131 has partially exited the scene, and the detector has (since the processing of the first image 100) become uncertain also whether person 131 is an object which is to be tracked. The detector has thus (since the processing of the first image 100) stopped providing further updates/indications about the persons 130 and 131 to the tracker. The tracker is, however, still able to track the persons 130 and 131 based on the information it has previously received (as indicated by the dashed boxes 150 and 151 still being present in FIG. 1B). The tracker correctly estimates that the person 130 is partially behind the tree 120, and that the person 131 has moved half-way out of the scene. However, having stopped receiving further indications from the detector about persons 130 and 131, the tracker will sooner or later fail to perform such tracking if the detector does not start providing such indications again. It may for example be such that person 130 stays behind the tree 120 long enough for the tracker to lose track of person 130. If person 130 then returns back from behind the tree 120, there may be one or more time-instances at which person 130 is not detected by the detector nor tracked by the tracker.

On the other hand, person 132 is now fully in the scene and the detector has become certain that person 132 is an object which is to be tracked (and most likely also masked). The same applies to person 133, which is also fully visible in the scene. The detector has thus started to provide indications of persons 132 and 133 to the tracker as objects which are to be tracked (and most likely also masked). However, as these are the first indications sent to the tracker about persons 132 and 133, the tracker can most likely not yet lock onto these persons as it has so far only been able to receive a single indication from the detector for each person (as both persons 132 and 133 just recently fully entered the scene). The tracker needs to receive at least one more indication for each one of persons 132 and 133, before the tracker is able to properly track persons 132 and 133 in the scene.

If applying conventional privacy masking based on the second image 101 alone, proper masking is likely possible for persons 132 and 133 as they are likely both indicated by the detector as objects which are also to be masked. Based on the output from the tracker, persons 130 and 131 may also be properly masked, but whether such masking will also succeed in one or more future images of the image stream is uncertain as these persons 130 and 131 are not currently indicated by the detector and risk being lost also by the tracker. There is therefore a risk that future privacy masking of these persons, if using conventional methods, will fail. Also, if it is assumed that the tracker has not been successful at tracking e.g., persons 130 and 131 when changing from the first image 100 to the second image 101, there is no indication provided by either the detector or tracker for these persons 130 and 131, and a masking of these persons 130 and 131 will consequently fail if outputting an output image (of an output stream) which corresponds to the second image 101.

How a method 500 as envisaged in the present disclosure can reduce the risk of failing to properly apply privacy masks to all objects (such as persons 130-133) will now be explained in more detail with reference once again to FIGS. 1A and 1B, as well as with reference to FIG. 1C.

The envisaged method 500 does not take into account only a single image (the second image 101) when performing masking in an output image 102 corresponding to the second image 101, but instead relies on an evaluation of the historical performance of the tracker and/or detector before arriving at a conclusion of where to apply privacy masks. This is obtained as follows.

The second image 101 as illustrated in FIG. 1B is to be used to generate the corresponding, particular output image 102 of the output image stream. Instead of only using the information available in the second image 101 to perform masking in the particular output image 102, the envisaged method also considers how the detector and/or tracker has historically performed when detecting and/or tracking objects. In the present example, this includes studying how the detector and/or tracker has performed when detecting and/or tracking objects at least in the first image 100. For ease of explanation, the "history" in this example is thus only the first image 100. It may, of course, also be such that the history includes one or more images previous in time to the first image 100.

When studying the history (i.e., the first image 100), the present image (the second image 101) and how the detector and/or tracker have historically performed, the envisaged method arrives at the following conclusions:

1) In the area of the first person 130 in the second image 101, the tracker has stopped receiving information from the detector indicative of an object (person 130) to be tracked (or masked). This corresponds to the condition "c)" as described herein.
2) In the area of the second person 131 in the second image 101, the tracker has stopped receiving information from the detector indicative of an object (person 131) to be tracked (or masked). This also corresponds to the condition "c)" as described herein.
3) In the area of the third person 132 in the second image 101, the tracker has started to receive information from the detector indicative of an object (person 132) to be tracked (or masked), but the tracker has not yet been able to start tracking of the object (person 132) to be tracked (or masked). This corresponds to the condition "d)" as described herein.

4) In the area of the fourth person 133 in the second image 101, the tracker has started to receive information from the detector indicative of an object (person 133) to be tracked (or masked), but the tracker has not yet been able to start tracking of the object (person 133) to be tracked (or masked). This also corresponds to the condition "d)" as described herein.

Based on the above, the envisaged method thereby concludes that at least conditions "c)" and "d)" have occurred in the areas of persons 130-133 in the second image 101, and that these areas thus constitute particular areas of the scene which are to be masked in the particular output image 102 (of the output image stream) that corresponds to the second image 101. The envisaged method thereby proceeds with masking these areas in the particular output image 102 of the output image stream, as illustrated by masks 160-163 in FIG. 1C. The masks 160-163 may also be provided in one or more other output images subsequent in time to the particular output image 102, at least until it is decided that such masks are no longer required to properly mask the persons 130-133. The sizes of the privacy masks 160-163 may for example correspond to the detected sizes of the persons (objects) 130-133, or e.g., be made larger than the corresponding persons 130-133. The shape of the privacy masks 160-163 may for example correspond to detected shapes of the persons 130-133, or e.g., be made rectangular, square, circular, or have any shape and size which sufficiently covers the respective persons 130-133 and perhaps also a larger area surrounding each person 130-133. Here, "sufficiently covers" is to be understood as covering enough of an object such that e.g., an identity of the object is not derivable, and/or e.g., enough of a license plate such that e.g., a license number written on the license plate is not derivable, etc. The persons 130 and 131 are detected by the detector as objects to be masked already in the first image 100. The tracker thus knows that persons 130 and 131 are to be masked when it follows the persons 130 and 131 in the second image 101, and may inform the masking unit accordingly. The persons 132 and 133 are detected by the detector as objects to be masked during the processing of the second image 101, and the detector (or the tracker) may then inform the masking unit accordingly.

It should be noted that the (static) privacy masks (e.g., 160-163) as applied in the envisaged method are associated with areas of the scene (i.e., areas of the particular output image 102), and not with particular objects in the scene. Phrased differently, the applied privacy masks are associated with areas which are deemed as problematic areas of the scene (or output image 102), in which objects may be assumed as being more likely to e.g., suddenly disappear from, or appear in, the scene, such that they become hard or impossible for the detector to detect (or for the tracker to track). The applied privacy masks are thus static in the sense that they do not move around along with the objects. It can be envisaged that the areas which are statically masked are defined such that if an object moves outside of these statically masked areas, the detector and/or tracker would be able to detect and/or track such objects without issues, and such that privacy masks can then be applied using conventional methods.

A privacy mask as envisaged herein may e.g., have a solid/opaque color, be semi-transparent, include applying a motion blur to an object such that the object can no longer easily be identified, and/or e.g., a forced pixelation and/or obfuscation of an object in the output image stream such that the object can no longer easily be identified, or similar. In other envisaged embodiments, a privacy mask may include making the objects themselves at least partially transparent in the output image stream, such that the background is visible through the objects. This may be possible if e.g., an image of the background without the object(s) in front is available (from e.g., an earlier time-instance).

By also analyzing the history of the tracker and/or detector, the envisaged method manages to identify "problematic" areas of a scene, wherein the risk of failing to properly mask an object is higher than in other areas of the scene. By applying static masks (i.e., masks which do not necessarily follow an object, but are rather fixed with regards to the scene itself), the risk of failing to mask an object appearing in these areas may thus be reduced. The masks may be applied for at least one subsequent image in the output image stream. When to remove the masks in the future may e.g., be decided based on the analysis performed of subsequent images of the input image stream, as will be explained in more detail later herein. A privacy mask may also be left in a particular area of a scene for an unforeseeable time, e.g., if the area is such that problems with object detection and/or tracking in that area continues to be problematic. Such areas may for example be, if using FIGS. 1A-1C for reference, where people regularly enters and/or exits the scene (such as the areas of the masks 161, 162 and 163), and/or areas where objects regularly become partially hidden or temporarily disappears (such as the area of the mask 160 where the pathway 122 goes behind the tree 120). It should be noted that in the example situation as illustrated in FIGS. 1A-1C, the person 131 does not necessarily pose any problem with masking as the tracker will likely keep track of the person 131 even though the detector stops indicating the person 131. Masking of the person 131 could therefore likely be performed until the person 131 completely leaves the scene. However, it may be assumed that the area where the person 131 happens to leave the scene is also an area where other people are likely to also enter the scene. Such an area may e.g., be where a walkway, road, or similar, leads to the outside of the scene, or e.g., a door, a corner of a building, or similar, where people are also likely to suddenly both enter and exit the scene. It may therefore be beneficial to apply a (static) mask in this area, such as the mask 161. Phrased differently, the envisaged method may utilize the fact that persons or other objects are often just as likely to enter the scene in areas where it is determined that persons or other objects exits the scene, and vice versa. In one or more other embodiments, it may be envisaged that (static) masking is only performed in areas where it can be determined that people only enter the scene, and not in areas where it can be determined that people only exit the scene. For example, the scene may include e.g., an outside of a building having both an entrance door and an exit door. It may be determined that an area where the tracker historically stops receiving updates from the detector, and is thus likely to lose track of objects, most likely corresponds to the entrance door of the building, and a static mask need not be applied in such an area. Likewise, it may be determined that an area where the tracker historically starts receiving updates from the detector most likely corresponds to the exit door of the building, and a (static) mask can be applied in such an area. If the scene is instead of an inside of a building, masks can instead be applied at a supposed entrance door of the building, and not be applied at a supposed exit door of the building. Phased differently, it is envisaged that (static) masking may be performed only in areas where they actually serve a purpose, and e.g., not in areas where objects only leave the scene.

Another example situation in which the envisaged method as disclosed herein is useful will now be described in more detail with reference to FIGS. 2A-2C.

Figure 2A:
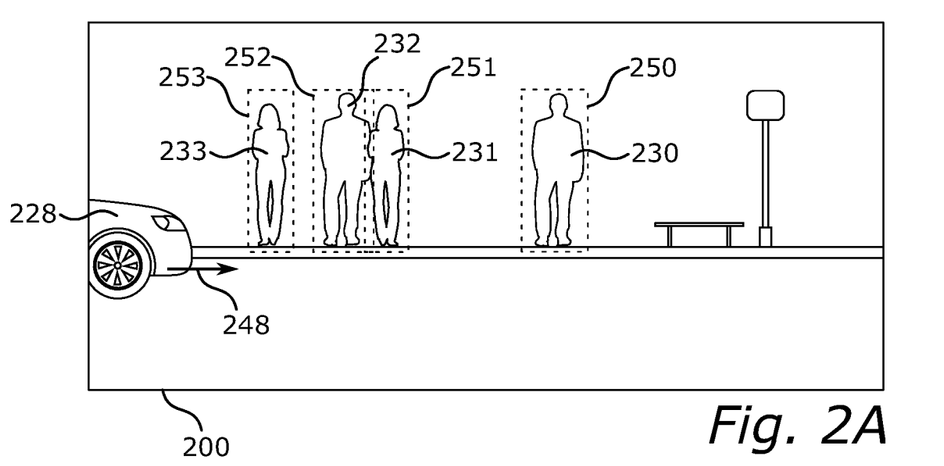
FIGS. 2A-2C schematically illustrate an example of another situation in which embodiments of a method according to the present disclosure is also applicable.

FIG. 2A schematically illustrates another situation in which the envisaged method may provide an improved masking vis-à-vis conventional masking techniques. A first image 200 is obtained from an input image stream capturing another scene. This other scene includes a plurality of persons 230-233 which are waiting at e.g., a bus stop. All persons 230-233 are fully visible in the scene when the first image 200 is captured, and the detector is thus certain that persons 230-233 are all objects which are to be tracked (and most likely also masked), and the detector may inform the tracker accordingly. If assuming that the persons 230-233 have been staying where they currently are during at least some additional previous images depicting the scene, the tracker has thus also been receiving previous indications of the persons 230-233 from the detector, and is already tracking the persons 230-233 as indicated by the dashed boxes 250-253. As shown to the left of FIG. 2A, a car 228 is about to enter the scene and moves in the direction indicated by the arrow 248.

Figure 2B:
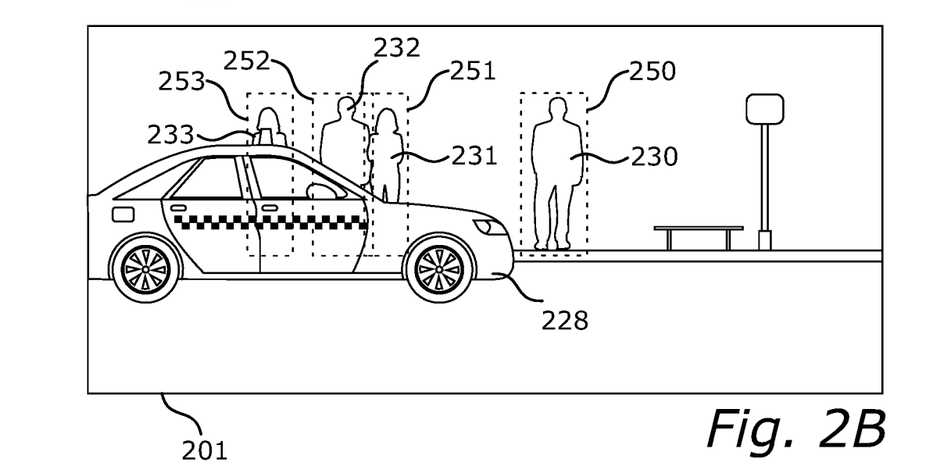

FIG. 2B schematically illustrates a second image 201 of the same input image stream capturing the same scene as in FIG. 2A. The second image 201 is subsequent in time to the first image 200, and the car 228 has now moved far enough into the scene such that it now partially obscures or blocks the persons 231, 232 and 233. Person 230 is still fully visible in the scene. When the car 228 starts to partially obscure or block the persons 231-233, the detector will become uncertain whether there is an object to be tracked (and masked) in the areas of the persons 231-233 which end up being at least partially hidden behind the car 228. Consequently, the detector stops to provide further updates/indications about the persons 231-233 to the tracker. As person 230 is still fully visible in the scene, the detector is still certain that person 230 is an object to be tracked (and masked), and continues to provide updated indications about the person 230 to the tracker.

If applying conventional privacy masking based only on the contents of the second image 102 when creating a corresponding particular output image 202 of the output image stream, proper masking is likely possible for person 230 but not so sure for persons 231-233 partially hidden behind the car 228. If the tracker has been able to previously lock onto the persons 231-233 before the car 228 appeared in the scene, the tracker may (for a while) be able to still correctly guess the positions of the persons 231-233 and inform the masking unit accordingly. If the car 228 however remains in front of persons 231-233 for an extended time, the tracker will however eventually fail to guess the positions of the persons 231-233 (as the tracker becomes more and more uncertain in its estimates as no new updates from the detector arrive), and there is a risk that the masking of the persons 231-233 will thus also fail (as neither the detector nor the tracker can then provide the information needed to the masking unit).

Figure 2C:
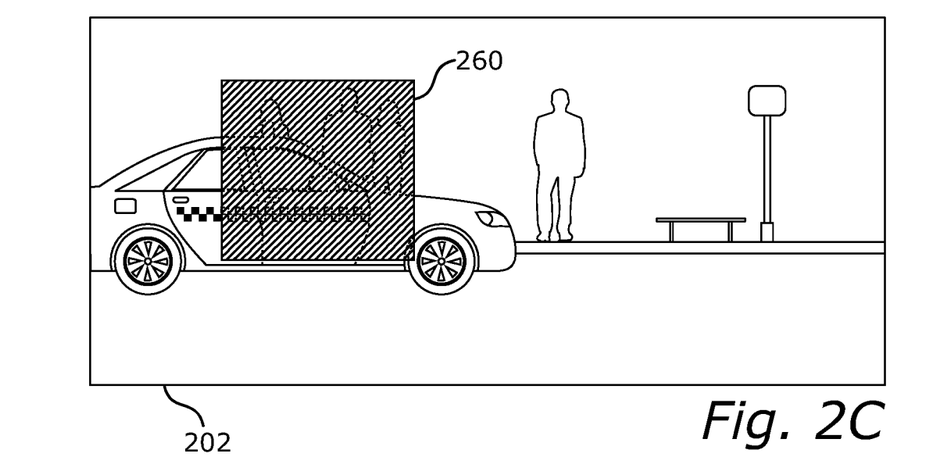

FIG. 2C schematically helps to illustrate how the improved method as envisaged herein solves the above problem of conventional privacy masking also for this scene and situation.

When studying the history (i.e., the first image 200), the present image (the second image 201) and how the detector and/or tracker have historically performed, the envisaged method arrives at the conclusion that: 1) in the areas of the second person 231, the third person 232 and the fourth person 233, the tracker has stopped receiving information from the detector indicative of an object (any of persons 231-233) to be tracked. This corresponds to the condition "c)" as described herein.

In addition, the envisaged method may also arrive at the conclusion that: 2) in the areas of the second person 231, the third person 232 and the fourth person 233, the detector has been certain (when processing the first image 200) that there is an object (any of persons 231-233) to be masked, but the detector has then (when processing the subsequent second image 201) become uncertain (here due to the car 228 entering the scene) whether there is any object to be masked. This corresponds to the condition "a)" as described herein.

The envisaged method may also, in addition to conclusion 2) above, also draw the conclusion that in the areas of the persons 231-233, the speed/rate at which the detector has gone from being certain to uncertain exceeds a fifth threshold. This because the car 228 enters the scene suddenly (e.g., within seconds), and the certainty of the detector of there being an object to be masked (or tracked) in the scene has then been lowered faster than would be the case if e.g., the car slowly 228 moved into the scene. It should be noted that if the car 228 was slowly moving into the scene, the above conclusion 1) would still hold, as there would still be at least one time-instance where the detector would become uncertain enough about whether there is any object to be masked (or tracked) to stop sending further updates/indications to the tracker.

Thus, as shown above, the envisaged method may handle the situation described with reference to FIGS. 2A-2B better than conventional masking techniques, as the car 228 suddenly entering the scene helps to trigger not only one, but at least two, conditions (conditions a) and c)) as envisaged herein. As illustrated in FIG. 2C, the envisaged method then proceeds with defining the areas of persons 231-233 as particular areas of the scene where a (static) masking should be performed, and applies a (static) mask 260 in these particular areas in the particular output image 202 (of the output image stream) corresponding to the second image 201. Although not shown in FIG. 2C, the method may of course apply a mask also over person 230, but then using e.g., conventional methods as person 230 remains fully visible in the scene in both the first and second images 200 and 201. As persons 231-233 is standing close to each other, it is envisaged that only a single static mask 260 is applied. This may however not always be the case, and it may of course then be envisaged to apply individual static masks to the persons 231-233 being or becoming partially hidden behind the car 228.

The situation described above with reference to FIGS. 2A-2C may also be used to describe yet a further embodiment of the envisaged method. If imagining that after the second image 201 is captured, the car 228 remains in front of the persons 231-233 long enough for the tracker to eventually lose track of the persons 231-233. The car 228 then starts moving again, and exists the scene such that it no longer partially hides the persons 231-233. The detector would then once again be able to detect the persons 231-233 and decide that these are objects which are to be masked in the scene, and resume sending corresponding indications/updates to the tracker. This can be done when e.g., processing a subsequent third image (not shown, but envisaged as depicting the persons 230-233 without any object partially blocking them). When processing the third image, the tracker has just recently started to once again receive indications/updates from the detector, and hast not yet been able to start tracking the corresponding objects (as it awaits at least one more indication/update from the detector). Evaluating the performance of the detector and tracker, in order to generate an output image corresponding to the third (input) image may then include studying how the detector and/or tracker performed when processing at least the first image 200 and the second image 201, as well as how the detector and/tracker has performed during processing of the imagined third image. The envisaged method would then arrive at the conclusion that (after the car 228 has left the scene) 3) the historical performance of the tracker includes that the tracker has resumed to receive information from the detector indicative of an object (any of persons 231-233) to be tracked, but has not yet been able to resume tracking of the object to be tracked. This also corresponds to the condition "d)" as described herein. In other situations, it can be envisaged that the car 228 leaves the scene before the tracker loses track of the persons 231-233. The particular areas of the persons 231-233 can however still be masked with (static) privacy masks as it will still be noted that the detector has gone from being certain that there is an object to be masked to being uncertain whether there is an object to be masked in the scene (condition "a)"), and/or because the tracker has stopped receiving indications about the persons 231-233 from the detector in this area of the scene.

In general, the envisaged method suggests defining the "problematic areas" of the scene as including problematic areas of either one or both of the detector and the tracker. A problematic area of the detector may be defined as where the detector has historically been more uncertain than certain whether there is any object to be masked (or tracked), corresponding to condition "b)" as defined herein. Such problematic areas for the detector may e.g., be areas close to a boundary of the image depicting the scene, where the detector normally has problems with identifying objects as the objects are often only partially visible in these areas of the image (e.g., the areas where the walkway 122 enters and exits the scene as described with reference to FIGS. 1A-1C). These areas may likely remain in the scene over time, and it may thus be advantageous to statically mask these areas.

A problematic area for the detector may also be defined as where the detector has historically gone from being certain to becoming uncertain (corresponding to condition "a)" as defined herein) due to e.g., a blocking object appearing in the scene and blocking the one or more objects the detector had previously identified, such as e.g., in the example with the car 228 entering the scene as described with reference to FIGS. 2A-2C. The likelihood of such blocking objects once again appearing in the scene may be high (if at e.g., a bus-stop, a taxi-stop, a train-station, or similar where potential blocking objects frequently will appear in and disappear from the scene, and similar), and it may thus be advantageous to statically mask these problematic areas also for this reason.

A problematic area of the tracker can for example be defined as an area wherein an uncertainty of a position in the scene of an object tracked by the tracker has been deemed being too great to mask the object (corresponding to condition "e)" as defined herein). It is envisaged to use e.g., a threshold value which the certainty of the tracker must overcome in order for the estimated position of the object being deemed certain enough, and where any estimated positions of the objects with certainty below this threshold value are considered having an uncertainty too great to mask the object. It should be noted that the tracker is usually not able to, on its own, figure out whether a particular object is to be masked or not. Instead, the tracker only estimates current and/or future positions of objects it has been told by the detector) to track, and whether a tracked object is deemed as an object which is to be masked or not depends on whether the tracker manages to track the position of the object with a certainty greater than the threshold value. For example, the tracker may output, for an object o, an estimated position $L(o)=(x', y')$ of the object "o", along with an estimated uncertainty $\sigma(o)=(\Delta x', \Delta y')$, telling that the position of the object o is somewhere in the interval $(x'\pm\Delta x', y'\pm\Delta y')$. In this case, an object once indicated by the detector as an object to be both tracked and masked may be deemed having an uncertainty too great to mask the object if the uncertainty $(\Delta x', \Delta y')$ is higher than e.g., a predefined threshold value. In other embodiments, it is envisaged that the tracker may instead output e.g., a position $L(o)=(x', y')$, together with one or more other parameters such as confidence level values, confidence intervals, standard deviations, means, etc., from which a corresponding uncertainty in the position of an object estimated by the tracker may be derived. If defining the problematic area of the tracker independent of a corresponding problematic area of the detector, the problematic area of the tracker may be greater than that of the detector, as the tracker is often able to continue (at least for some time) to track an object in the scene even after having stopped receiving updates/indications about the object from the detector.

In some embodiments of the envisaged method, it may be advantageous to define a problematic area of the tracker as e.g., where both conditions "b)" and "e)" has historically occurred, where the detector has stopped sending updates/indications of an object to be tracked (or even masked), and where the tracker has then failed to further track the object with great enough certainty in its estimates of position. Such areas may e.g., correspond to situations where there is a door through which objects exits the scene and never comes back (or comes back only after a sufficiently long time for the tracker to lose track of the object), a tree which is big enough such that a person moving behind the tree stays sufficiently hidden for a sufficiently long time for the tracker to lose track of the person, or similar.

In some embodiments of the envisaged method, the evaluation of the historical performance of the tracker and/or detector may be performed by constructing a so-called "heatmap". Herein, a heatmap is e.g., a two-dimensional map of the scene, wherein each point of the heatmap corresponds to a particular area of the scene. Generally herein, "an area" of the scene may e.g., be a single pixel, a collection of pixels, or any other part of the scene not corresponding to the whole of the scene. For each point of the heatmap, a value may then be assigned, and it may be determined in advance whether e.g., a larger value corresponds to a problematic area and a smaller value corresponds to a non-problematic area, or vice versa. Phrased differently, the value of each point of the heatmap may be bound to lie within a particular spectrum of values, and it may be determined whether values towards or at one end of the spectrum correspond to problematic areas and values towards or at another end of the spectrum correspond to non-problematic areas, or vice versa. In what follows, for exemplary reasons only, it will be assumed that a higher value of a point of the heatmap corresponds to the corresponding area of the scene more likely being a problematic area (for which a privacy mask should be applied), while a lower value of the same point of the heatmap corresponds to the corresponding area of the scene more likely being a non-problematic area. Whether a value has sufficiently moved towards an end of the spectrum may be checked by e.g., comparing the value to a threshold value. Such a heatmap may then be used as follows.

Each time it is determined that at least one of the events "a)-e)", as explained earlier herein, has occurred in a particular area of the scene in the current image (or in previous images, if the heat map is created based on historical information), the value of the corresponding point of the heatmap is increased (phrased differently, the temperature is increased at this point of the heatmap). If it is then determined that the value at the particular point of the heatmap exceeds a threshold value, the corresponding area of the scene is decided to be a problematic area, and considered as the particular area of the scene which is masked in the particular output image of the output image stream. In some embodiments, it may be determined how long backwards historical data should be included in the heatmap (as well as the dynamic decreasing of data that is described below). The heat map may then have to be updated as older data has to be removed. In other embodiments, all historical data may be kept in the heat map.

As an example, if each image in the input image stream has a resolution of X×Y pixels, a heatmap H(x, y) of e.g., a same size may be constructed, each element H(x, y) indicating the value corresponding to the corresponding pixel (x, y) of the images in the input image stream. If the envisaged method determines that one of the events "a)-e)" has occurred in an area of the scene corresponding to a set of pixels $S=\{(x_1, y_1), (x_2, y_2), \ldots\}$, the heatmap may be updated such that the value of the heatmap at all points included in the set S are increased, e.g., by adding e.g., one to the previous value. The values may also be defined as having an upper boundary $H_{max}$, such that $H(x, y) < H_{max}$ for each point (x, y). One or more problematic areas of the scene may then be identified as corresponding to all elements of H(x, y) exceeding a threshold value $T_{HM1}$. By checking all elements of the heatmap H(x, y), it can thus be decided where (or if) a (static) mask should be applied in the particular output image of the output image stream. After running the envisaged method for a plurality of images in the input image stream, the heatmap will thus be "hot" for areas wherein the detector more often starts or stops indicating objects, and "cold" in areas wherein no such events normally occur.

The detector may for example, for each indicated object, return the set of pixels S identified as belonging to an object. In other embodiments, the detector may instead return e.g., a (center) coordinate of an object, together with an estimated size of the object (e.g., a height and width). In other embodiments, the detector may e.g., return coordinates of at least two corners of a rectangle enclosing the object, or similar. Independent of the exact form/shape of the output from the detector, it is envisaged that a corresponding set S of pixels can be identified and used to update the heatmap H(x, y). It should also be noted that each point of the heatmap may not necessarily correspond to a pixel, but may instead correspond to a larger area of the scene. For example, a scene may be divided into a plurality of regions (each region corresponding to multiple pixels), and the heatmap map then instead be such that each point of the heatmap corresponds to a particular such region of the scene. The detector may e.g., indicate whether an object is present in each region, but not provide any finer granularity with regards to the exact position and/or size and shape of the object.

As a further development of such an embodiment, the method may check whether the detector is currently (when processing the input image of the input stream corresponding to the particular output image of the output image stream) certain that there is an object to be masked at/in a particular area of the scene (and/or whether the tracker with sufficient certainty is currently following such an object to be tracked in the scene). If confirming that this is true, the method may then update the heatmap H(x, y) by instead decreasing the values at the elements of the heatmap corresponding to such a particular area of the scene. For example, if the detector indicates that an object is present in a set of pixels of an image of the scene, the heatmap may be updated by decreasing the value at the corresponding elements for this set of pixels. Thus, with certainty detecting and/or tracking an object in a particular area of the scene may "cool" the heatmap for the corresponding area. This may lead to one or more values ending up below the threshold value after having previously being above the threshold value. In such a case, the method may e.g., proceed by removing any previously applied masks for these areas of the scene. This maybe advantageous in e.g., an area which is temporally blocked by a blocking object (e.g., such as the car 228 described with reference to FIGS. 2A-2C).

Instead of making a "hot" area of the heat map correspond to a problematic area, it may of course as well be the opposite case, wherein the method is such that problematic areas are made cooler than non-problematic areas, e.g., by decreasing values of the heatmap corresponding to areas wherein the conditions "a)-e)" occur, and vice versa.

A method of masking in an output stream as envisaged herein will now be described in more detail with reference to FIG. 3 and FIG. 4. These figures illustrate various embodiments of a method 400 as envisaged herein, and as already described with reference to FIGS. 1A-1C and 2A-2C.

Figure 3:
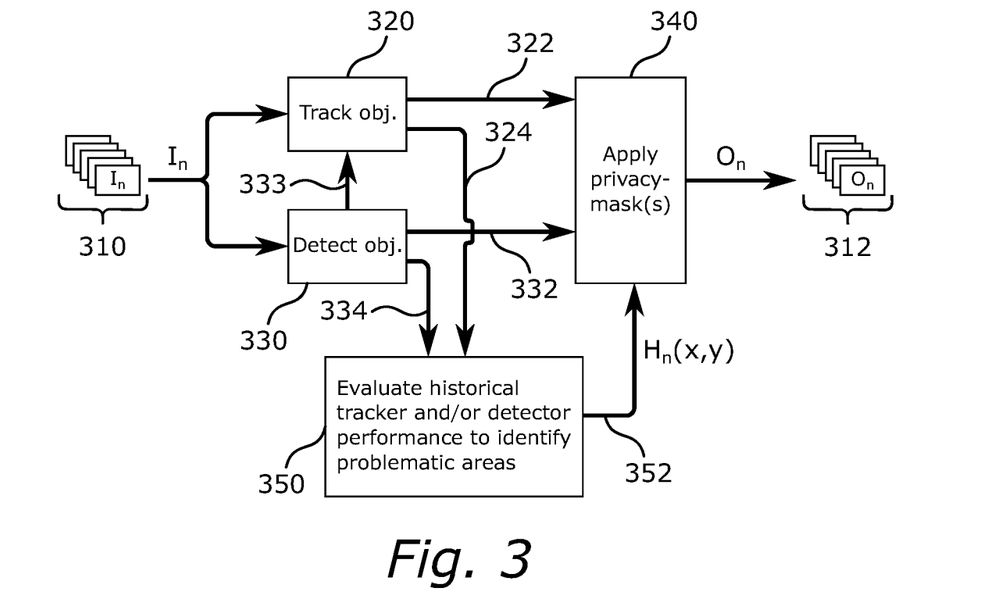
FIG. 3 schematically illustrates a functional block diagram corresponding to an embodiment of the method according to the present disclosure.
Figure 4:
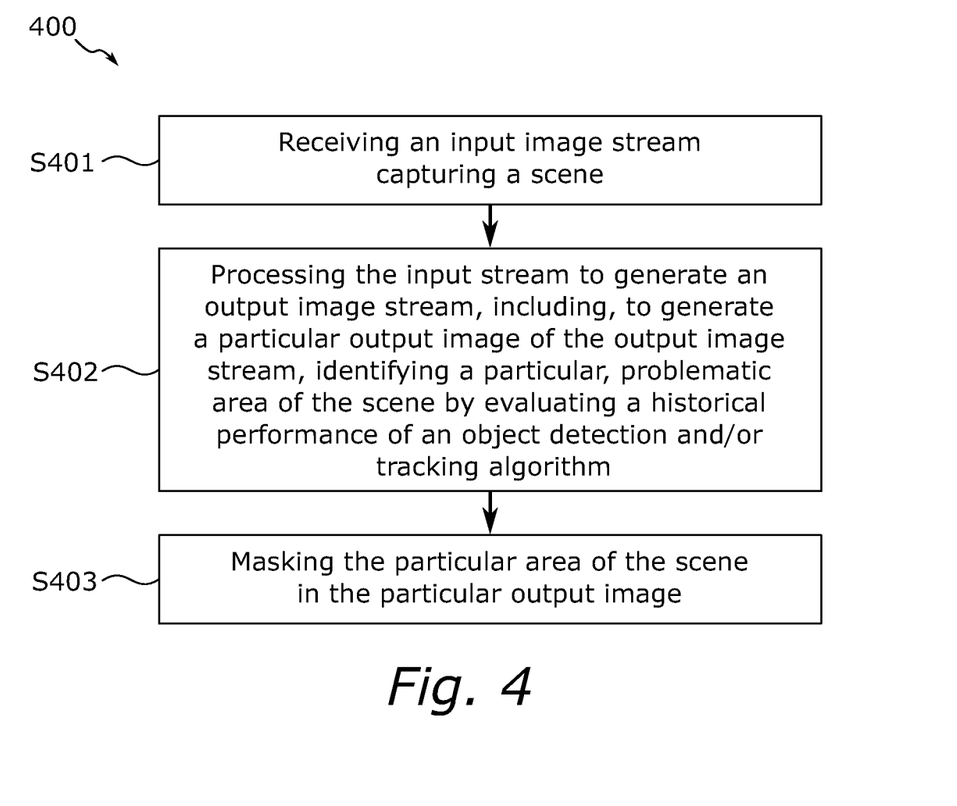
FIG. 4 schematically illustrates a flowchart of an embodiment of a method according to the present disclosure, and FIGS. 5A and 5B schematically illustrates an embodiment of a device according to the present disclosure.

FIG. 3 schematically illustrates a functional block diagram 300, which illustrates various functional blocks operating to perform the method 400 as envisaged herein. FIG. 4 schematically illustrates a flowchart of the method 400.

An input image stream 310 is received (in a step S401) from e.g., an image sensor of a video camera. Currently, an image $I_n$ (where n is an integer indicating that this image is the n:th image of the input image stream 310) of the input image stream 310 is about to be analyzed and processed. The image $I_n$ is provided both to a tracking module 320 and to a detection module 330 for processing (in a step S402), in order to generate an output image stream 312 based on the input image stream 310.

The tracking module 320 is configured to perform object tracking, while the detection module 330 is configured to perform object detection, as discussed earlier herein, based on the input image stream 310. The tracking module 320 provides tracking data 322 regarding one or more objects it is currently tracking in the image $I_n$ to a masking module 340. The tracking module 320 may of course use information from one or more previous images $I_{m<n}$ to perform tracking of one or more objects in the image $I_n$. The tracking data may e.g., include the estimated (tracked) position of an object, together with some measurement of how certain the estimate is, as described earlier herein. In some embodiments, the tracking data 322 may also include e.g., an indication about whether a tracked object is an object to be masked or not. Such an indication may first be provided to the tracking module 320 from the detection module 330.

The detection module 330 provides detection data 332 regarding one or more objects it believes are in the image $I_n$ to the masking module 340. The detection data 332 also includes a probability indicating how certain the detection module 330 is that the object is an object to be tracked (or even masked). The detection module 330 also provides similar or the same detection data 333 to the tracking module 320, such that the tracking module 320 can use the detection data 333 to improve its tracking performance. The detection data 333 may also include an indication about whether an object to be tracked is also an object to be masked.

The tracking module 320 and the detection module 330 also provide performance data 324 and 334, respectively, to a performance analysis module 350. The performance data 324 may for example include the tracking data 322, while the performance data 334 may for example include the detection data 332. In particular, the performance data 324 includes sufficient information such that the performance analysis module 350 may derive how the tracking module 320 has historically performed, including e.g., the uncertainty of positions of objects estimated by the tracking module 320. The performance data 324 includes sufficient information such that the performance analysis module 350 may derive how the detection module 330 has historically performed, including e.g., the probability of how certain the detection module 330 has been that there is (or is not) an object to be tracked in the scene, and e.g., whether the detection module 330 believes that the object should also be masked.

The performance analysis module 350 receives (and e.g., stores) the performance data 324 and 334 for each image in the input image stream 310, and can thus keep track of:
- if, when and how the tracking module 320 has stopped, started or resumed to receive updates/indications 333 from the detection module 330 (for e.g., evaluating conditions "c)" and/or "d)" as defined earlier herein);
- how certain the tracking module 320 has been of its estimations (for evaluating condition "e)" as defined earlier herein), and/or
- if, when and how the detection module 330 has been certain or uncertain whether there is an object to be tracked or masked (for evaluating conditions "a)" and/or "b)" as defined earlier herein).

The performance analysis module 350 outputs performance evaluation data 352 to the masking module 340. The performance evaluation data 352 may for example be, or include, a heatmap $H_n(x, y)$, as described earlier herein, to be used by the masking module 340 when masking a corresponding n:th image $O_n$ of an output image stream 312. In other embodiments, the heatmap $H_n(x, y)$ may be used only internally in the performance evaluation module 350, which may then instead provide direct information about the one or more areas to be masked to the masking module 340 as part of the performance evaluation data 352. The tracking data 324 and detection data 334 sent to the performance evaluation module 350 may of course also include data about how the tracker and detection modules 320 and 330 have performed when processing/analyzing the most recent input image $I_n$, such that this most recent performance can also be considered as part of the historical evaluation performed by the module 350.

The masking module 340 then applies, based on the tracking data 322, the detection data 332, and in particular also on the performance evaluation data 352, masking of one or more objects in the scene and outputs the output image $O_n$ as part of the output image stream 312 if it is (in a step S403) confirmed that one or more such particular areas exist. In particular, the masking module 340 applies static privacy masks based on the performance evaluation data 352. For example, if receiving the heatmap $H_n(x, y)$, the masking module 340 may check whether a particular area/pixel of the scene corresponding to the point at $(x, y)$ of the heatmap is to be masked or not in the image $O_n$, e.g., by comparing the value of this point of the heatmap $H_n(x, y)$ against a threshold value. In other embodiments, such an analysis is performed already in the performance evaluation module 350.

After the image $O_n$ is output as part of the output image stream 312, the method 400 may proceed by receiving a next image of the input image stream 310, e.g., an image $I_{n+1}$, and repeat the process to perform masking in a particular next output image $O_{n+1}$ and so on. Exactly how many previous images $I_{m<n}$ that are considered when analyzing image $I_n$ can be tailored as desired. It may for example be that the number of previous images taken into account changes also with time, as result of the conditions of the scene (such as number of moving objects entering and exiting the scene, time-of-day, etc.) also changing with time. In other embodiments, the number of previous images considered can be static, and e.g., correspond to a predefined number of seconds, days, hours, weeks, months, or similar, of captured and analyzed/processed input images of the scene. As also mentioned herein, the most recent input image $I_n$, and the outcome of the analysis thereof by the tracking and detection modules 320 and 330, can also be considered as part of the historical performance evaluation.

In one or more embodiments, the data 322 and 332 sent to the masking module 340 may include the various probabilities and certainties of the detection module 330 and tracking module 320, and it may be up to the masking module 340 to compare these values against e.g., one or more thresholds to decide whether a particular object is an object to be masked or not. In other embodiments, such decisions may instead be taken already by the detection module 330 and/or the tracking module 320, such that e.g., the data 332 and 322 does not need to contain e.g., the various probabilities and certainties. For example, the detection module 320 may decide that it is certain enough about an object that the object should be masked, and send the position of this object to the masking module 340 as part of the data 332. If the detection module 320 is instead uncertain whether the object should be masked, the detection module 320 may chose not to send information (such as a position) of this object to the masking module 340. Likewise, the tracking module 320 may choose to send information about an object to be masked to the masking module 340 only if it has been told by the detection module 330 that the object should be tracked and masked, and if it has determined that a certainty of an estimated position of the object is high enough. Phrased differently, whether decisions about whether an object to be masked or not is taken in the detection module 330, the tracking module 320 and/or the masking module 340 are not important as long as a decision is taken somewhere. However, in particular, whether to mask one or more areas of the scene considered as problematic areas which are to be statically masked should be based on the output 352 from the performance evaluation module 350.

In one or more embodiments, it is envisaged that the output 352 from the performance evaluation module 350 may instead (or in addition) be provided to the detection module 330 and/or to the tracking module 320, such that these may communicate where to apply a static mask to the masking module 340 using e.g., the data 322 and 332. In one or more other embodiments, the data 322 and 332 is preferably concerned with information regarding objects which are to be masked and not part of the problematic area(s), while information about the additional masking required for the problematic area(s) is instead provided to the masking module 340 via the output 352 from the performance evaluation module 350.

It is to be noted that the disclosed method 400 (as also shown/illustrated by the functional block diagram of FIG. 3) not only uses instant object detection and/or tracking data (i.e., as obtained only from the input image $I_n$) to perform masking, but also relies on historical such data and an evaluation of the historical performance of the detection and/or tracking modules. This because the performance analysis module 350 keeps track of the performance of the tracking module 320 and detection module 330 for at least also some previous images $I_{m<n}$. This allows the envisaged and disclosed method 400 to apply static (privacy) masking in areas where it has historically been more difficult for the tracker and/or detector to properly track and/or indicate one or more objects, in order to not risk failing to mask objects in these areas.

The present disclosure also envisages a device for masking in an output image stream, as will now be described in more detail with references to FIGS. 5A and 5B.

Figure 5A:
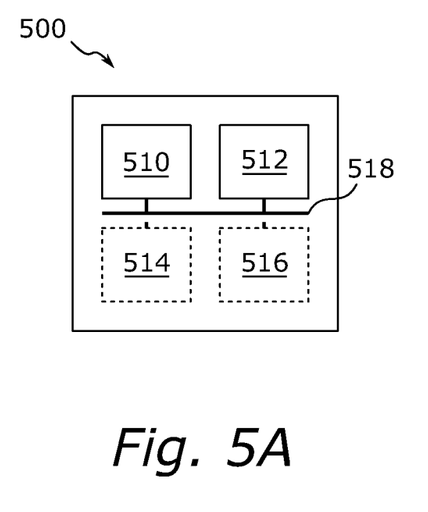

FIG. 5A schematically illustrates an embodiment of a device 500. The device 500 includes at least a processor (or "processing circuitry") 510, and a memory 512. As used herein in the present disclosure, a "processing circuitry" or "processor" may for example be any combination of one or more of a suitable central processing unit (CPU), multiprocessor, microcontroller (μC), digital signal processor (DSP), graphics processing unit (GPU), application specific integrated circuit (ASIC), field-programmable gate-array (FPGA), etc., capable of executing software instructions stored in the memory 512. The memory 512 may be external to the processor 410, or be internal to the processor 510. As used herein in the present disclosure, a memory may e.g., be any combination of random-access memory (RAM) and read only memory (ROM), or any other memory in which instructions for the processor 410 may be stored. The memory 512 contains (i.e., stores) instructions that, when executed by the processor 510, causes the device 500 to perform e.g., any of the embodiments of methods 400 disclosed earlier herein. The device 500 may further include one or more additional items 516 which may, in some situations, be necessary for performing the method. In some embodiments, the device 500 may for example be a monitoring camera, and the additional items 516 may then include e.g., an image sensor and for example one/or more lenses for focusing light captured from a scene (towards which the monitoring camera is aimed) on the image sensor in order to capture an input image stream of (i.e., depicting) the scene. The additional items 516 may also include e.g., various other electronics components needed for capturing the scene, e.g., to properly operate the image sensor and/or lenses. This allows for the method to be performed in the monitoring camera itself (i.e., at the "edge"), which may reduce the need for any subsequent processing of the image stream output from the monitoring camera for the purpose of privacy masking, etc. In other embodiments, in e.g., a body-worn camera system (BWC system), the method as envisaged herein may be executed in a system controller or in a docking station (if sufficient processing power is available there), instead of at the camera worn on the body.

If the device 500 is to be connected to a network (e.g., if the device 400 is a network camera), the device 500 may further include a network interface 514. The network interface 514 may be e.g., a wireless interface supporting e.g., Wi-Fi (as defined in e.g., IEEE 802.11 or subsequent standards), and/or a wired interface supporting e.g., Ethernet (as defined in e.g., IEEE 802.3 or subsequent standards), or similar. A communication bus 518 may for example be provided to interconnect the various parts 510, 512, 514, and 516, such that these parts may communicate with each other as required to obtain a desired functionality.

Figure 5B:
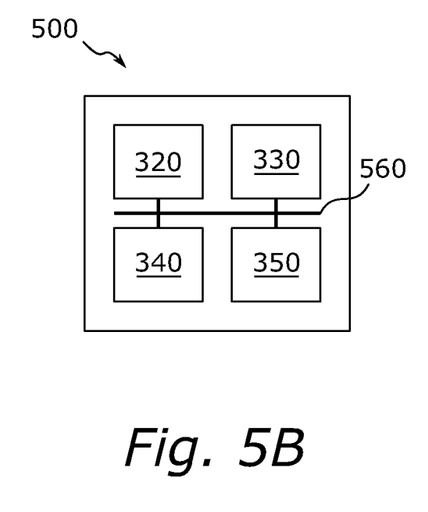

FIG. 5B schematically illustrates an embodiment of the device 400 as described with reference to FIG. 5A, but represented as a collection of functional blocks corresponding e.g., to those discussed with reference to FIG. 3. The device 500 includes the tracking module 320, the detection module 330, the masking module 340, and the performance analysis module 350. The modules 320, 330, 340 and 350 are interconnected such that they may communicate with each other as necessary (indicated by the line 360). One, more or all of the modules 320, 330, 340 and 350 may for example be implemented in software only, in hardware only, and/or as a combination of software and hardware. Such software may for example be provided by the instructions stored in the memory 512. Each module 320, 330, 340 and 350 may be provided as a separate entity, or two or more or all of the modules 320, 330, 340 and 350 may be provided as forming part of a same, single entity.

Envisaged herein is also to provide one or more computer programs. One such computer program may for example be for performing the method 400 of masking in an output image stream as discussed and envisaged herein, for performing such a method in the device 500 described with reference to FIGS. 5A and 5B. A computer program may for example correspond to the instructions stored in the memory 512 of the device 500, such that the corresponding method is performed by the device 500 when the processor (or processing circuitry) 510 executes the instructions. In other envisaged embodiments, the computer programs may be in a form not yet readable and executable by the processor 510, but rather be provided as e.g., text specified according to a programming language, which text needs to be compiled to a format readable by the processor 510, e.g., by using a therefor suitable compiler. The compiler may of course be executed by the processor 510 itself, or even form part of the processor 510 itself for real-time compilation. Envisaged herein is also to provide one or more computer program products. Each such computer program product includes a computer readable storage medium on which one or more of the above-mentioned computer programs are stored. For example, one computer program product may include the computer program for performing the envisaged method of masking in an output image stream as disclosed and discussed herein. A (computer-readable) storage medium (e.g., a "memory") may e.g., be any combination of random-access memory (RAM) and read only memory (ROM). In some embodiments, the computer readable storage medium may be transitory (e.g., an electric signal readable by the processor). In other embodiments, the computer readable storage medium may be non-transitory (e.g., in form of a non-volatile memory, such as a hard disk drive (HDD), a solid-state drive (SSD), a secure digital (SD) card or similar, a USB flash drive, or similar such as any combination of magnetic memory, optical memory, solid-state memory, or even remotely mounted memory. Other types of computer readable storage mediums are also envisaged, as long as their functionality allows to store the computer program such that they are readable by the processor and/or by an intermediate compiler.

In summary of the various embodiments presented herein, the present disclosure provides an improved way of achieving reliable (privacy) masking in an image output stream, in particular in situations where an object detector and/or object tracker may fail to properly indicate and/or track one or more objects. By using not only instant data from the tracker and/or detector, but also an evaluation of the historical performance of the tracker and/or detector, the envisaged way of masking provides a more reliable procedure wherein the risk of failing to properly mask an object in one or more images (i.e., image frames) of the output image stream are reduced or eliminated even in more difficult conditions.

Although features and elements may be described above in particular combinations, each feature or element may be used alone without the other features and elements or in various combinations with or without other features and elements. Additionally, variations to the disclosed embodiments may be understood and effected by the skilled person in practicing the claimed disclosure, from a study of the drawings, the disclosure, and the appended claims.

In the claims, the words "comprising" and "including" does not exclude other elements, and the indefinite article "a" or "an" does not exclude a plurality. The mere fact that certain features are recited in mutually different dependent claims does not indicate that a combination of these features cannot be used to advantage.

LIST OF REFERENCE NUMERALS

100, 200 first images
101, 201 second images
120 tree
122 walkway
124 house
126 door
130-132 objects (persons)
140-143 movement directions
150, 151 tracked objects
160-163 privacy masks
228 car
230-233 objects (persons)
248 movement direction
250-253 tracked objects
260 privacy mask
310, 312 input image stream, output image stream
320, 330 tracking module, detection module
322, 332 tracking data, detection data
324, 334 tracking performance data, detection performance data
333 detection data to tracker
340 masking module
350 performance evaluation module
352 performance evaluation data
400, S401-S403 method, method steps
500 device
510 processor
512 memory
514 network interface
516 additional item(s)
518 communication bus
560 inter-module communication

What is claimed is:

1. A method of masking in an output image stream, comprising:
receiving an input image stream capturing a scene;
processing the input image stream to generate an output image stream, including, based on the input image stream, detecting and tracking one or more objects in the scene using an object detection algorithm and an object tracking algorithm receiving information indicative of objects to be tracked from the object detection algorithm, the processing further including, to generate a particular output image of the output image stream, performing at least one of:
a) determining that in one or more input images previous to the particular output image, the object detection algorithm has generated a probability of an object being in a particular area of the scene not exceeding a second threshold and exceeding a fourth threshold smaller than the second threshold indicating that the object detection algorithm is uncertain whether there is any object to be masked, and that the object detection algorithm has also, in one or more additional input images previous to the one or more input images, generated a probability of an object being in the particular area exceeding the second threshold indicating that the object detection algorithm is certain that there is an object to be masked, wherein the particular area of the scene is determined by one or more parameters generated by the object detection algorithm, from which one or more parameters it is derivable where in the scene the object is;
b) determining that in input images previous to the particular output image, the object detection algorithm has
i) more often generated a probability of an object being in a particular area of the scene not exceeding a second threshold and exceeding a fourth threshold smaller than the second threshold indicating that the object detection algorithm is uncertain whether there is any object to be masked than a probability of an object being in the particular area of the scene exceeding the second threshold indicating that the object detection algorithm is certain whether there is any object to be masked, or
ii) more often generated a probability of an object being a particular area of the scene not exceeding a first threshold and exceeding a third threshold smaller than the first threshold indicating that the object detection is uncertain whether there is any object to be tracked than a probability of an object being in the particular in area exceeding the first threshold indicating that the object detection algorithm is certain whether there is an object to be tracked,
wherein the particular area of the scene is determined by one or more parameters generated by the object detection algorithm, from which one or more parameters it is derivable where the scene the object is;
c) determining that in one or more input images previous to the particular output image, the object tracking algorithm has stopped receiving information from the object detection algorithm indicative of an object to be tracked in a particular area of the scene, wherein the particular area of the scene is determined by one or more parameters generated by the object detection algorithm, from which one or more parameters it is derivable where in the scene object is;
d) determining that in one or more input images previous to the particular output image, the object tracking algorithm has started or resumed to receive information from the object detection algorithm indicative of an object to be tracked in a particular area of the scene but has not yet been able to start or resume tracking the object to be tracked, wherein the particular area of the scene is determined by one or more parameters generated by the object detection algorithm, from which one or more parameters it is derivable where in the scene the object is, and e) determining that in one or more input images previous to the particular output image, an uncertainty of a position in the scene of an object tracked by the object tracking algorithm has been deemed being too great to mask the object in a particular area of the scene, wherein the particular area of the scene is determined by one or more parameters generated by the object detection algorithm, from which one or more parameters it is derivable where in the scene the object is, and masking the particular area of the scene in the particular output image.

2. The method according to claim 1, comprising performing both b) and e).

3. The method according to claim 1, comprising performing a), and wherein said determining of a) further comprises determining that a rate of the object detection algorithm becoming uncertain whether there is any object to be masked has exceeded a fifth threshold.

4. The method according to claim 1, wherein said determining of any of a)-e) comprises using a heatmap.

5. The method according to claim 1, wherein, in a)-e), a total number of said one or more input images previous to the particular output image is lower than the total number of input images of the input image stream preceding the particular output image in time.

6. The method according to claim 1, wherein the method is performed in a monitoring camera configured to capture the input image stream.

7. A device for masking in an output image stream, comprising:
a processor, and
a memory storing instructions that, when executed by the processor, cause the device to:
receive an input image stream capturing scene;
process the input image stream to generate an output image stream, including, based on the input image stream, to detect and track one or more objects in the scene using an object detection algorithm and an object tracking algorithm receiving information indicative of objects to be tracked from the object detection algorithm, to generate a particular output image of the output image stream, and to perform at least one of:

a) determining if in one or more input images previous to the particular output image, the object detection algorithm has generated a probability of an object being in a particular area of the scene not exceeding a second threshold and exceeding a fourth threshold smaller than the second threshold indicating that the object detection algorithm is uncertain whether there is any object to be masked, and that the object detection algorithm has also, in one or more additional input images previous to the one or more input images, generated a probability of an object being in the particular area exceeding the second threshold indicating that the object detection algorithm is certain that there is an object to be masked, wherein the particular area of the scene is determined by one or more parameters generated by the object detection algorithm, from which one or more parameters it is derivable where in the scene the object is;

b) determining if in input images previous to the particular output image, the object detection algorithm has:

i) more often generated a probability of an object being in a particular area of the scene not exceeding a second threshold and exceeding a fourth threshold smaller than the second threshold indicating that the object detection algorithm is uncertain whether there is any object to be masked than a probability of an object being in the particular area of the scene exceeding the second threshold indicating that the object detection algorithm is certain whether there is any object to be masked, or ii) more often generated a probability of an object being a particular area of the scene not exceeding a first threshold and exceeding a third threshold smaller than the first threshold indicating that the object detection is uncertain whether there is any object to be tracked than a probability of an object being in the particular in area exceeding the first threshold indicating that the object detection algorithm is certain whether there is an object to be tracked, wherein the particular area of the scene is determined by one or more parameters generated by the object detection algorithm, from which one or more parameters it is derivable where the scene the object is;

c) determining if in one or more input images previous to the particular output image, the object tracking algorithm has stopped receiving information from the object detection algorithm indicative of an object to be tracked in a particular area of the scene, wherein the particular area of the scene is determined by one or more parameters generated by the object detection algorithm, from which one or more parameters it is derivable where in the scene object is;

d) determining if in one or more input images previous to the particular output image, the object tracking algorithm has started or resumed to receive information from the object detection algorithm indicative of an object to be tracked in a particular area of the scene, but has not yet been able to start or resume tracking the object to be tracked, wherein the particular area of the scene is determined by one or more parameters generated by the object detection algorithm, from which one or more parameters it is derivable where in the scene the object is, and e) determining if in one of more input images previous to the particular output image, an uncertainty of a position in the scene of an object tracked by the object tracking algorithm has been deemed being too great to mask the object in a particular area of the scene, wherein the particular area of the scene is determined by one or more parameters generated by the object detection algorithm, from which one or more parameters it is derivable where in the scene the object is, and in response to said determining of at least one of a)-e) being affirmative, mask the particular area of the scene in the particular output image.

8. The device according to claim 7, wherein the instructions are further configured to cause the device to perform both b) and e).

9. A device according to claim 7, wherein the device is a monitoring camera configured to capture the input image stream.

10. The device according to claim 7, wherein the instructions are further configured to cause the device to perform a), and wherein said determining of a) further comprises determining that a rate of the object detection algorithm becoming uncertain whether there is any object to be masked has exceeded a fifth threshold.

11. The device according to claim 7, wherein the instructions are further configured to cause said determining of any of a)-e) to use a heatmap.

12. The device according to claim 7, wherein the instructions are further configured to cause the device to perform, in a)-e), wherein a total number of said one or more input images previous to the particular output image is lower than the total number of input images of the input image stream preceding the particular output image in time.

13. The device according to claim 7, wherein the instructions are further configured to cause the device to perform the method in a monitoring camera configured to capture the input image stream.

14. A computer program stored on a non-transitory computer-readable medium for masking in an output image stream, configured to cause, when executed by a processor of a device, cause the device to:
   receive an input image stream capturing a scene;
   process the input image stream to generate an output image stream, including, based on the input image stream, to detect and track one or more objects in the scene using an object detection algorithm and an object tracking algorithm receiving information indicative of objects to be tracked from the object detection algorithm, to generate a particular output image of the output image stream, and to perform at least one of:
      a) determining if in one or more input images previous to the particular output image, the object detection algorithm has generated a probability of an object being in a particular area of the scene not exceeding a second threshold and exceeding a fourth threshold smaller than the second threshold indicating that the object detection algorithm is uncertain whether there is any object to be masked, and that the object detection algorithm has also, in one or more additional input images previous to the one or more input images, generated a probability of an object being in the particular area exceeding the second threshold indicating that the object detection algorithm is certain that there is an object to be masked, wherein the particular area of the scene is determined by one or more parameters generated by the object detection algorithm, from which one or more parameters it is derivable where in the scene the object is;
      b) determining if in input images previous to the particular output image, the object detection algorithm has:
   i) more often generated a probability of an object being in a particular area of the scene not exceeding a second threshold and exceeding a fourth threshold indicating that the object detection algorithm is uncertain whether there is any object to be masked than a probability of an object being in the particular area of the scene exceeding the second threshold indicating that the object detection algorithm is certain whether there is any object to be masked, or
   ii) more often generated a probability of an object being a particular area of the scene not exceeding a first threshold and exceeding a third threshold smaller than the first threshold indicating that the object detection is uncertain whether there is any object to be tracked than a probability of an object being in the particular in area exceeding the first threshold indicating that the object detection algorithm is certain whether there is an object to be tracked,
   wherein the particular area of the scene is determined by one or more parameters generated by the object detection algorithm, from which one or more parameters it is derivable where the scene the object is;
      c) determining if in one or more input images previous to the particular output image, the object tracking algorithm has stopped receiving information from the object detection algorithm indicative of an object to be tracked in a particular area of the scene, wherein the particular area of the scene is determined by one or more parameters generated by the object detection algorithm, from which one or more parameters it is derivable where in the scene object is;
      d) determining if in one or more input images previous to the particular output image, the object tracking algorithm has started or resumed to receive information from the object detection algorithm indicative of an object to be tracked in a particular area of the scene, but has not yet been able to start or resume tracking the object to be tracked, wherein the particular area of the scene is determined by one or more parameters generated by the object detection algorithm, from which one or more parameters it is derivable where in the scene the object is,
   and
      e) determining if in one of more input images previous to the particular output image, an uncertainty of a position in the scene of an object tracked by the object tracking algorithm has been deemed being too great to mask the object in a particular area of the scene, wherein the particular area of the scene is determined by one or more parameters generated by the object detection algorithm, from which one or more parameters it is derivable where in the scene the object is,
   and
   in response to said determining of at least one of a)-e) being affirmative, mask the particular area of the scene in the particular output image.

15. A computer program product according to claim 14, further configured to cause the device to perform a method comprising performing both b) and e).

16. A computer program product, including a computer readable storage medium storing a computer program according to claim 14.

* * * * *